United States Patent
Schmidt

(10) Patent No.: US 7,115,174 B2
(45) Date of Patent: Oct. 3, 2006

(54) METHOD FOR PRODUCING AND OXIDE LAYER ON METALLIC ELEMENTS

(75) Inventor: Hans-Peter Schmidt, Mettmann (DE)

(73) Assignee: L'Air Liquide, (FR)

( * ) Notice: Subject to any disclaimer, the term of this patent is extended or adjusted under 35 U.S.C. 154(b) by 24 days.

(21) Appl. No.: 10/489,987

(22) PCT Filed: Nov. 30, 2002

(86) PCT No.: PCT/EP02/13555

§ 371 (c)(1),
(2), (4) Date: Sep. 13, 2004

(87) PCT Pub. No.: WO03/052158

PCT Pub. Date: Jun. 26, 2003

(65) Prior Publication Data

US 2005/0028891 A1 Feb. 10, 2005

(30) Foreign Application Priority Data

Dec. 18, 2001 (DE) .............................. 101 62 339

(51) Int. Cl.
C23C 8/34 (2006.01)
(52) U.S. Cl. ...................... 148/216; 148/217
(58) Field of Classification Search ......... 148/216–217
See application file for complete search history.

(56) References Cited

U.S. PATENT DOCUMENTS 6,383,297 B1 * 5/2002 Schmidt ................... 118/688

FOREIGN PATENT DOCUMENTS

WO  WO 99/10556  * 3/1999

* cited by examiner

Primary Examiner—Roy King
Assistant Examiner—Michael P. Alexander

(57) ABSTRACT

In a known method for producing an oxide layer on metal parts, the metal parts are heat-treated in a treatment chamber during a carburization phase at temperatures below 1100° C. [2012° F.] in an atmosphere containing carbon monoxide and hydrogen and then, during an oxidation phase, they are oxidized at an oxidation temperature in the range from 750° C. to 950° C. [1382° F. to 1742° F.] in an atmosphere where a $PH_2O$-to-$PH_2$ ratio between 0.3 and 10 has been established by feeding an oxidant into the treatment chamber, a process in which an oxide layer is formed, whereby the oxygen partial pressure is determined by means of an oxygen probe and regulated at least during the oxidation phase. In order to improve the known method in terms of the reproducibility of the formation of corrosion-resistant coatings that cover and adhere well on metal parts containing iron and so as to improve the cost effectiveness of the process, it is proposed according to the invention that the oxygen partial pressure be regulated in such a way that the oxygen probe indicates a probe voltage in the range from 890 mV to 940 mV.

9 Claims, No Drawings

METHOD FOR PRODUCING AND OXIDE LAYER ON METALLIC ELEMENTS

The invention relates to a method for producing an oxide layer on metal parts in which the metal parts are heat-treated in a treatment chamber during a carburization phase at temperatures below 1100° C. [2012° F.] in an atmosphere containing carbon monoxide and hydrogen and then, during an oxidation phase, they are oxidized at an oxidation temperature in the range from 750° C. to 950° C. [1382° F. to 1742° F.] in an atmosphere where a $PH_2O$-to-$PH_2$ ratio between 0.3 and 10 has been established by feeding an oxidant into the treatment chamber, a process in which an oxide layer is formed, whereby the oxygen partial pressure is determined by means of an oxygen probe and regulated at least during the oxidation phase.

The quenching and tempering, case hardening or carbonitriding, etc. of serially-produced parts is carried out in furnace installations through whose treatment chamber inert and/or reactive gases flow. In this process, the gas atmosphere in the treatment chamber of the furnace is set in such a way that a clean and bright metal surface is obtained. Oxidation is not desired.

With the use of nitrogen in combination with reactive components (for example, methanol cracking gas, an endothermic atmosphere or the like), the parts are heated up to the appertaining austenitizing temperature, then thermochemically treated and hardened by quenching in oil, water or liquid salt.

In a subsequent second heat-treatment step, the requisite hardness is set by annealing the hardened parts. The annealing takes place at temperatures between 100° C. and 550° C. [212° F. and 1022° F.] in an air or nitrogen atmosphere.

Under these annealing conditions, the iron can oxidize to form magnetite ($Fe_3O_4$). The oxide layer formed does not exhibit sufficient layer thickness to provide a visually attractive and uniform decorative surface.

Therefore, the heat-treatment procedure is followed by coating processes that produce a visually attractive and uniform decorative layer on the surfaces. These coatings are often applied by means of demanding wet-chemical processes (burnishing, phosphatization, etc.). Acids, lyes, highly concentrated salt solutions and washing water are employed in such cases and they generate large quantities of hazardous waste and emissions. These coating processes entail considerable processing effort and additional costs.

As an alternative to this, in a process of the above-mentioned type according to German patent DE 197 36 514 C, the coating is generated by targeted oxidation of the iron materials that are to be treated. Here, the parts to be heat-treated are oxidized in a defined manner during the hardening process (holding phase) so as to be simultaneously hardened and blackened in the heat-treatment furnace. During the course of the heat-treatment process, an oxidizing component (oxidant) is fed into the treatment chamber. A furnace gas atmosphere that has an oxidizing effect on iron is established after a brief time and a continuous iron oxide layer is spontaneously formed on the surface of the material, a process which can be expressed by the following chemical reaction:

$$Fe+H_2O \Leftrightarrow FeO+H_2$$

The barrier layer formed prevents an undesired de-carburization of the edge zone of the alloy. Due to the defined furnace gas atmosphere that has been set, a certain $PH_2O$-to-$PH_2$ ratio is established that exerts a positive influence on the iron oxide structure and on the growth rate of the oxide. Oxide layers with a thickness of a few micrometers (maximum of 10 μm) have proven to be particularly advantageous.

The heat treatment and the oxidation of the parts take place in separate process steps in the shared treatment chamber. This method, for the first time, allows an essentially environmentally friendly production of decorative and corrosion-proof coatings.

The present invention is based on the objective of improving the method of this generic type in terms of the reproducibility of the production of corrosion-resistant coatings that cover and adhere well on metal parts containing iron and of improving the cost effectiveness of the process.

According to the invention, this objective is achieved on the basis of the above-mentioned process according to the invention in that the oxygen partial pressure is regulated in such a way that the oxygen probe indicates a probe voltage in the range from 890 mV to 940 mV.

The probe voltage is kept at a value in the range from 890 mV to 940 mV during the oxidization phase within a temperature range of 750° C. to 950° C. [1382° F. to 1742° F.]. Here, the probe voltage to be established is based on the following dependence on the partial pressure ratio ($PH_2O/PH_2$):

$$\text{voltage(mV)}=(\text{LOG}(PH_2O/PH_2)-13027/T+3.2906)$$
$$\cdot T \cdot 0.0992 \text{ (temperature in Kelvin)}$$

The probe voltage is a measure of the oxidation potential (oxygen activity) in the treatment chamber. It has been surprisingly found that, in the case of metal parts containing iron, an optimally adhesive and dense oxide layer is obtained within this narrow process window. This can be ascribed to the degree of disarrangement of the iron oxide that is formed in this process. Within the temperature range cited and in the case of the oxygen partial pressures defined by the probe voltage, this is wüstite ($Fe_{1-y}O$) 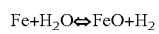. The degree of disarrangement (y) of the wüstite generated by the method according to the invention lies in the range from 0.05 to 0.12, which promotes the formation of a dense oxidation layer that adheres well.

Moreover, at an oxygen partial pressure within a range as defined by the cited probe voltage range, the duration of the oxidation can be shortened so that this also translates into a "rise in productivity" in comparison to the prior-art method.

Along with this, the shortening of the duration of the oxidation also leads to a reduction of the otherwise frequently observed partial de-carburization of the edge of the material, a phenomenon caused by a reaction of the oxygen in the area of the grain boundaries (intragranular attack).

Furthermore, during the heating of the treatment chamber that follows the oxidation phase and that is meant for a subsequent batch to be treated, the requisite carbon level of the endothermic atmosphere is built up more quickly.

The FeO oxide layer formed has a uniform structure, it adheres well, it is scratch-resistant as well as free of bubbles or contact areas. Within a short oxidation time (typically less than 20 minutes), an oxide layer (FeO layer) that is less than 10 μm thick is formed due to the defined oxygen activity. The layer thus built up is compact, covers well, can be interlocked well with the base material and has an attractive black color.

With an oxygen partial pressure that yields a probe voltage of more than 940 mV, the build-up of the oxide layer is too slow, with the result that pronounced decarburization of parts of the edge of the material occurs. In the case of an excessive oxygen partial pressure that results in a probe voltage of less than 890 mV, in contrast, an undesired thick oxidation layer is formed that can chip off or form bubbles in places. This defect can also be noticed in that oxide particles can be wiped off. The cause lies in an excessively thick oxide layer that is formed at a higher speed (mm per hour) owing to the higher degree of disarrangement.

The oxidant is normally distilled water, although other oxidants such as air or oxygen should not be ruled out.

Preferably, the oxygen partial pressure is regulated in such a way that the oxygen probe indicates a probe voltage ranging from 900 mV to 925 mV. This range of the probe voltage has proven to be a particularly suitable compromise between optimal oxide properties and minimal edge decarburization on the one hand, and the desired black color on the other hand.

Preference is given to a variant of the method in which a first constant partial amount of the oxidant and a second partial amount of the oxidant are fed into the treatment chamber, whereby the second partial amount is fed in a regulated manner and as a function of the probe voltage. Here, only a partial amount of the total quantity of oxidant is fed into the treatment chamber in a regulated manner (regulated amount) while the other partial amount—which can be the smaller partial amount—does not have to be regulated (base amount). This serves to simplify the regulation and to reduce the complexity of the equipment needed.

Another improvement of this variant of the method consists in feeding in the second partial amount intermittently. The intermittent feed of the oxidant is conducive to a better regulation constancy. As a result, the target value to be regulated hardly fluctuates, so that the deviation from the target voltage is merely a few mV (millivolts), for instance, ±1 millivolt.

Preference is given to a procedure in which a nitrogen stream is fed into the treatment chamber, and this stream is set as a function of the composition of the atmosphere in the treatment chamber. The retention time of the gas components is influenced by means of the variable nitrogen stream.

In this context, care should be taken to ensure that the retention time of the components in the gas phase is reflected in the course of the probe voltage over time, which is also decisive for the outcome of the oxide formation. Particularly in the first minutes of a gas phase change from a carburization phase to the oxidation phase, the nucleation of the oxide on the metallic iron surface can be influenced by the gas phase. If the oxygen partial pressure drops too rapidly, the number of oxide nuclei formed is low so that the oxide color makes more of a transition towards gray. Therefore, the speed at which the probe voltage is lowered from the carburization phase (at a probe voltage of, for example, 1060 mV) to the oxidation phase (at a probe voltage of, for example, 920 mV) influences the outcome of the oxide properties and has to be optimized by experiments as a function of the material and shape of the part.

An optimal result in terms of the properties of the oxide layer on the metal parts is obtained when the maximum oxidation temperature is 830° C. [1526° F.]. Here, the optimal probe voltage is around 920 mV. Lowering the oxidation temperature has a positive effect on the oxide properties. Here, the specific materials that have actually been employed as well as the desired nucleus hardness play a decisive role.

But it is not only the amount of oxidant fed in that is important for the quality of the oxide layer formed, but rather also the amount of nitrogen that is fed into the treatment chamber together with the oxidant. It has been found that nitrogen volumes of 6 $m^3$ to 12 $m^3$ per hour are optimal. By varying this volume of nitrogen, the color and uniformity of the oxide to be formed can be improved. Naturally, the nitrogen quantity is also based on the free volume present in the treatment chamber and, for safety reasons, must not fall below a certain minimum amount.

It has proven to be especially advantageous to raise the carburization temperature in the treatment chamber after completion of the oxidation phase and to establish a carbon level of 0.2% to 0.3% C in the treatment chamber. Consequently, the water can react faster and more efficiently with the lubrication gas (hydrocarbons, for example, natural gas or propane), as a result of which the oxygen partial pressure drops considerably, or else the probe voltage rises. A favorable voltage value at which a new batch can be conveyed into the treatment chamber is 1000 mV. Starting at this voltage, there is no longer a difference from the commonly employed batches which have not been preceded by oxidation since here air always enters the treatment chamber when the furnace doors are opened, as a result of which the probe voltage drops to low values. Efforts are aimed at achieving the fastest possible change from oxidation to a neutral or carburizing endothermic atmosphere phase. The result of this special modality of formation is that formation times of 10 to 15 minutes are commonly achieved, which translates into only a slight prolongation of the treatment duration.

The method according to the invention is particularly suitable for the production of coatings in the discontinuous mode of operation. However, a variant of the method that has also proved to be advantageous is one in which the metal parts are continuously moved through the treatment chamber so that they can be hardened and so that the oxide layer can be produced.

The invention will be described in greater detail below with reference to embodiments.

EMBODIMENT 1

In a multipurpose chamber furnace that operates discontinuously (brand name: TQ 10), tool-holding fixtures made of case-hardened steel 16 MnCr 5 were placed and affixed in charging racks. These were then moved into the heating and treatment chamber and brought to the desired temperature. An endothermic atmosphere (20% CO, 40% $H_2$ and the rest $N_2$) made from natural gas continuously flowed through the multipurpose chamber furnace as the carrier gas during the entire carburization phase. The carbon level of the gas phase was regulated through the addition of hydrocarbons until the desired edge carbon content of 0.75% C and the requisite case-hardening depth of 1.20 mm had been reached. The entire process was regulated or controlled by means of the existing process control system. At a case-hardening depth of 1.10 mm, the furnace temperature was lowered to 830° C. [1526° F.] and the carbon level was kept constant at 0.75 mm.

Shortly before the end of the treatment time and before the case-hardening depth of 1.20 mm had been reached, water—as the oxidant—together with nitrogen were injected into the treatment chamber of the furnace. The volumetric flow rates of the oxidizing reactant and of the nitrogen were set in such a way that the $PH_2O$-to-$PH_2$ ratio established in the treatment chamber of the furnace yielded a constant probe voltage of 920 mV. Over the course of 12 minutes, a thin, adhesive FeO oxide layer was formed having a thickness of 5 μm and a blue-black color.

The following criteria were fulfilled:
1. adhesive, black oxide layer
2. no light-colored areas caused by contact areas
3. no bubble formation or chipping off of the oxide layer 4. surface hardness prior to the annealing: 57 to 58 HRC
5. oxide layer still adheres after the annealing: (180° C. [356° F.], 3 hours)
6. surface hardness after the annealing: 52 to 54 HRC
7. no edge de-carburization
8. overall assessment: no defects!

The C level of the furnace gas atmosphere desired after the oxidation treatment was reached once again after a brief time, so that no oxidation or de-carburization of the following batch occurred. No water condensation was observed on the cold spots of the antechamber or in the exhaust gas lines. The reproducibility of the oxidation processes was flawless.

The corrosion resistance of these parts oxidized by means of the method according to the invention is better than that of the conventionally coated, burnished parts, so that the parts can be stored for longer periods of time without the formation of detrimental rust. It is then possible to dispense with oiling the oxidized parts or applying a fluid—as is done in burnishing—without this giving rise to a rust film. Due to the elimination of the surface-active liquids, the parts do not have to undergo complicated cleaning procedures during the subsequent mechanical processing operations; the absence of any residual liquid adhering to the parts makes it possible to use the drilling emulsion for a longer time since no contamination is possible.

Prior to the burnishing process, the hardened parts have to be depassivated by means of sandblasting so that a layer having a thickness of 1 μm to 2 μm can be formed. During sandblasting, grains of sand and particles easily accumulate in blind holes or fissures and they damage the drills or cutting tools, thus considerably reducing the service life of these tools, so that demanding, painstaking cleaning operations have to be carried out for the parts. These costs and time losses were all eliminated through the use of the coating method according to the invention so that the parts could be quickly further processed.

The invention claimed is:

1. A method for producing an oxide layer on metal parts, the metal parts are heat-treated in a treatment chamber during a carburization phase at temperatures below 1100° C. [2012° F.] in an atmosphere containing carbon monoxide and hydrogen and then, during an oxidation phase, they are oxidized at an oxidation temperature in a range from 750° C. to 950° C. [1382° F. to 1742° F.] in an atmosphere where a $PH_2O$-to-$PH_2$ ratio between 0.3 and 10 has been established by feeding an oxidant into the treatment chamber, a process in which an oxide layer is formed, whereby the oxygen partial pressure is determined by means of an oxygen probe and regulated at least during the oxidation phase, the oxygen partial pressure is regulated in such a way that the oxygen probe indicates a probe voltage in the range from 890 mV to 940 mV, a first constant partial amount of the oxidant and a second partial amount of the oxidant being fed into the treatment chamber, whereby the second partial amount is fed in a regulated manner and as a function of the probe voltage.

2. The method according to claim 1, characterized in that the oxygen probe indicates a probe voltage in the range from 900 mV to 925 mV.

3. The method according to claim 2, characterized in that the second partial amount is fed in intermittently.

4. The method according to claim 1, characterized in that a nitrogen stream is fed into the treatment chamber that is varied as a function of the composition of the atmosphere in the treatment chamber.

5. The method according to claim 1, characterized in that the treatment chamber is brought to the carburization temperature after completion of the oxidation phase, and a carbon level in the range from 0.2% to 0.3% C is established in the treatment chamber.

6. The method according to claim 5, characterized in that the carbon level is regulated, whereby a propane gas stream ted into the treatment chamber is employed as a control quantity for the regulation.

7. The method according to claim 1, characterized in that the oxidation temperature is optimally 830° C. [1526° F.].

8. The method according to claim 1, characterized in that the metal parts are moved continuously through the treatment chamber so that they can be hardened and so that the oxide layer can be produced.

9. The method according to claim 1, characterized in that the second partial amount is fed in intermittently.

* * * * *

UNITED STATES PATENT AND TRADEMARK OFFICE
CERTIFICATE OF CORRECTION

PATENT NO. : 7,115,174 B2
APPLICATION NO. : 10/489987
DATED : October 3, 2006
INVENTOR(S) : Hans-Peter Schmidt It is certified that error appears in the above-identified patent and that said Letters Patent is hereby corrected as shown below:

Title page, item "73 Assignee: L'Air Liquide, (FR)" should be <u>73 Assignee: L'Air Liquide, Societe Anonyme A Directoire et Conseil de Surveillance pour l'Etude et l'Exploitation des Procedes Georges Claude</u>.

Signed and Sealed this

Fourteenth Day of September, 2010

David J. Kappos
*Director of the United States Patent and Trademark Office*